(12) United States Patent
Chopperla

(10) Patent No.: US 12,197,369 B2
(45) Date of Patent: *Jan. 14, 2025

(54) METHOD AND SYSTEM FOR PROVIDING CONFIGURATION DATA TO A FIELD-PROGRAMMABLE GATE ARRAY VIA MULTIPLE PROTOCOL MODES

(71) Applicant: GOWIN Semiconductor Corporation, GuangZhou (CN)

(72) Inventor: Diwakar Chopperla, Fremont, CA (US)

(73) Assignee: GOWIN SEMICONDUCTOR CORPORATION, Guangzhou (CN)

( * ) Notice: Subject to any disclaimer, the term of this patent is extended or adjusted under 35 U.S.C. 154(b) by 60 days.

This patent is subject to a terminal disclaimer.

(21) Appl. No.: 17/520,513

(22) Filed: Nov. 5, 2021

(65) Prior Publication Data

US 2023/0143302 A1 May 11, 2023

(51) Int. Cl.
*G06F 13/38* (2006.01)
*G06F 1/08* (2006.01)
*G06F 13/42* (2006.01)

(52) U.S. Cl.
CPC .............. *G06F 13/385* (2013.01); *G06F 1/08* (2013.01); *G06F 13/4282* (2013.01); *G06F 2213/0016* (2013.01)

(58) Field of Classification Search
CPC .... G06F 1/08; G06F 11/3027; G06F 11/3041; G06F 11/3051; G06F 13/385; G06F 13/4282; G06F 15/177; G06F 15/7867; G06F 15/7871; G06F 30/34; G06F 2213/0016; G06F 1/10; G06F 1/12

See application file for complete search history.

(56) References Cited

U.S. PATENT DOCUMENTS

| | | | | |
|---|---|---|---|---|
| 11,366,776 B1* | 6/2022 | Zhai | ..................... | G06F 13/1668 |
| 11,468,220 B2* | 10/2022 | Zhu | .................. | H03K 19/17728 |
| 11,662,923 B2* | 5/2023 | Zhu | ....................... | G06F 3/0632 |
| | | | | 711/103 |

(Continued)

OTHER PUBLICATIONS

"MachXO3 Programming and Configuration Usage Guide". Technical Note TN1279. Apr. 2015. Lattice Semiconductor Corporation. (Year: 2015).*

*Primary Examiner* — Thomas J. Cleary

(74) *Attorney, Agent, or Firm* — JW Law Group; James M. Wu

(57) ABSTRACT

A hybrid mode system containing an external device and a field-programmable gate array ("FPGA") capable of providing configuration data to FPGA via a hybrid communication channel is disclosed. The system is able to identify a first communication protocol in accordance with at least a portion of address bits presented on a serial data line ("SDA") wherein SDA is used as a connection between FPGA and the external device. The clock signals for receiving data are adjusted to a first clock frequency in accordance with the first communication protocol and clock cycles presented on a serial clock line ("SCL"). SCL is used to connection between FPGA and the external device. After transmitting the configuration data, a portion of FPGA is programmed to perform user-defined logic functions in response to the configuration data.

23 Claims, 9 Drawing Sheets

(56) References Cited

U.S. PATENT DOCUMENTS

| | | | |
|---|---|---|---|
| 2009/0079467 A1* | 3/2009 | Sandven | G06F 15/7867 |
| | | | 326/38 |
| 2019/0197007 A1* | 6/2019 | Suarez | G06F 13/385 |
| 2021/0019279 A1* | 1/2021 | Cvejanovic | H04L 12/40091 |
| 2021/0318981 A1* | 10/2021 | Jurski | G06F 13/4282 |
| 2022/0027071 A1* | 1/2022 | Zhu | G06F 3/0604 |

* cited by examiner

METHOD AND SYSTEM FOR PROVIDING CONFIGURATION DATA TO A FIELD-PROGRAMMABLE GATE ARRAY VIA MULTIPLE PROTOCOL MODES

FIELD

The exemplary embodiment(s) of the present application relates to the field of programmable semiconductor devices for logic operations involving in the computer hardware and software. More specifically, the exemplary embodiment(s) of the present invention relates to transmitting configuration data to a field-programmable gate array ("FPGA") or programmable logic device ("PLD").

BACKGROUND

With increasing popularity of digital communication, artificial intelligence (AI), IoT (Internet of Things), and/or robotic controls, the demand for faster, flexible, and efficient hardware and/or semiconductors with processing capabilities is constantly in demand. To meet such demand, high-speed and flexible semiconductor chips are generally more desirable. One conventional approach to satisfy such demand is to use dedicated custom integrated circuits and/or application-specific integrated circuits ("ASICs"). A shortcoming with the ASIC approach is that it lacks flexibility while consumes a large number of resources.

An alternative approach, which enjoys the growing popularity, is utilizing programmable semiconductor devices ("PSDs") such as programmable logic devices ("PLDs") or field-programmable gate arrays ("FPGAs"). A feature of PSD is that it allows an end-user to program and/or reprogram one or more desirable functions to suit his/her applications after the PSD is fabricated.

A drawback, however, associated with a conventional FPGA or PLD is relating to transmitting configuration data to an FPGA with limited input output ("IO") ports and speed.

SUMMARY

One embodiment of the present application discloses a hybrid mode system ("HMS") able to facilitate transmission of configuration data from an external device to a field-programmable gate array ("FPGA") via a hybrid communication channel. When FPGA as a slave device reads at least a portion of address bits presented on a serial data line ("SDA") with clock cycles presented on a serial clock line ("SCL"), a first communication protocol is identified. SDA and SCL are used to connect FPGA to an external device. The first communication protocol, for example, can be an Inter-Integrated Circuit ("I2C") communication protocol or an Improved Inter-Integrated Circuit ("I3C") communication protocol depending on the address bits of SDA. The clock signals are subsequently adjusted to a first clock frequency in accordance with the first communication protocol and clock cycles presented on SCL. After receiving the configuration data, a portion of FPGA is programmed to perform user-defined logic functions in response to the configuration data.

Additional features and benefits of the exemplary embodiment(s) of the present invention will become apparent from the detailed description, figures, and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
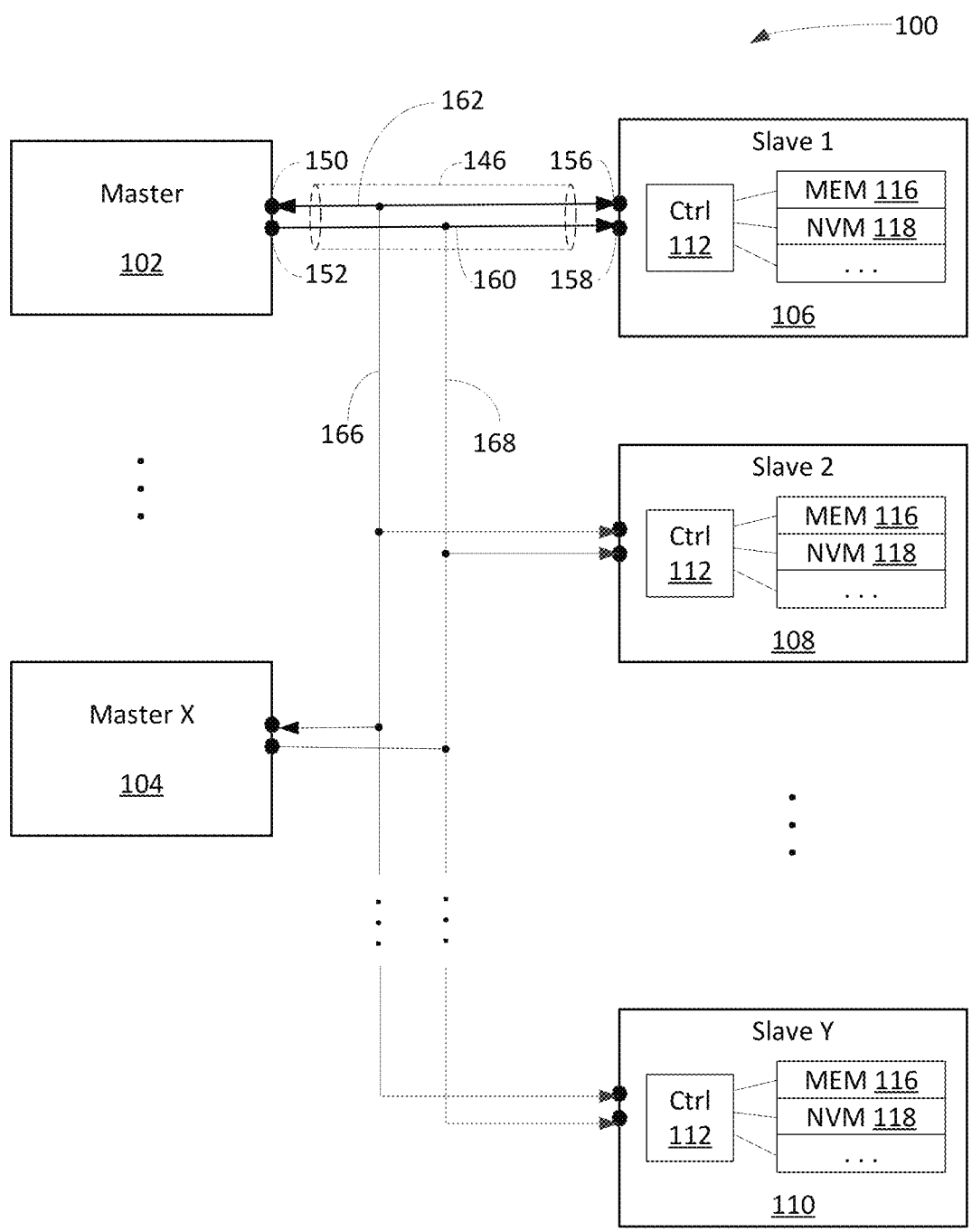
FIG. 1 is a block diagram illustrating a hybrid mode system ("HMS") able to provide configuration data to one or more programmable semiconductor devices ("PSDs") using a selectable multi-mode channel ("SMC") or hybrid multi-protocol channel ("HMC") in accordance with one embodiment of the present invention.

Embodiments of the present invention disclose a method(s) and/or apparatus for transmitting information to a programmable semiconductor device ("PSD") or programmable integrated circuit ("PIC") via one of multiple communication protocols.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field-programmable gate arrays (FPGAs), application-specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device, such as but not limited to, magnetoresistive random access memory ("MRAM"), phase-change memory, or ferroelectric RAM ("FeRAM"), flash memory, ROM (Read Only Memory), PROM (Programmable Read-Only Memory), EEPROM (Electrically Erasable Programmable Read-Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present application discloses a hybrid mode system ("HMS") containing an external device such as a memory or controller and an FPGA. While the external device can be considered as a master device, FPGA can be configured to be a slave device. HMS, in one aspect, is configured to facilitate transmission of configuration data from the external device to FPGA via one of multiple communication protocols. HMS, in another aspect, is able to facilitate transmission of configuration data from the external device to FPGA via the I3C communication protocol.

In operation, when FPGA as a slave device reads and/or processes at least a portion of address bits presented on SDA with clock cycles presented on SCL, a first communication protocol such as I2C or I3C is identified. SDA and SCL are part of HMC used to connect FPGA to the external device. The first communication protocol, for example, can be an I2C communication protocol or an I3C communication protocol depending on the value of address bits carried by SDA. The clock signals are subsequently adjusted to a first clock frequency in accordance with the first communication protocol and clock cycles presented on SCL. After receiving the configuration data, a portion of FPGA is programmed to perform user-defined logic functions in response to the configuration data.

FIG. 1 is a block diagram 100 illustrating a HMS able to provide configuration data to one or more programmable semiconductor devices ("PSDs") using a selectable multi-mode channel ("SMC") or hybrid multi-protocol channel ("HMC") in accordance with one embodiment of the present invention. Diagram 100 includes multiple masters 102-104, multiple slaves 106-110, and SMC 146. While masters such as master 102 can be referred to as controller and/or memories, slaves are PSDs. PSD, also known as FPGA, PIC, and/or a type of Programmable Logic Device ("PLD"), is an integrated circuit capable of being configured by a customer or user after manufacturing. To simplify the foregoing discussion, the terms "PSD", "PIC", FPGA, and PLD are referring the same or similar devices and they can be used interchangeably hereinafter. It should be noted that the underlying concept of the exemplary embodiment(s) of the present invention would not change if one or more blocks (circuit or elements) were added to or removed from diagram 100.

Masters 102-104, in one example, are hardware devices such as controllers, processors, memory storages, and/or programmable devices capable of providing configuration bit streams. Masters 102-104 can be modules, dies, integrated circuits ("ICs"), chips, external devices, systems, and the like. A function of master such as master 102 is to transmit a bitstream containing configuration information to one or more slaves 106-110 via SMC or bus 146. In one aspect, a master such as master 102 uses one or more transmission protocols to transmit the bitstream of configuration data to one or more slaves via SMC 146. The transmission or bus protocol can be, but not limited to, serial peripheral interface ("SPI"), I2C, I3C, universal asynchronous receiver-transmitter ("UART"), Integer ("Int"), two-wire interface ("TWI"), Timer, and the like.

Slaves 106-110, in one embodiment, are FPGAs containing controllers 112, programmable logic blocks ("PLBs"), and memories 116-118. While PLBs are used to perform user-defined functions, memories 116-118 includes volatile memories 116, and non-volatile memories ("NVMs") 118. Volatile memory 116, in one example, is SRAM (static random-access memory) fuse array used to store configuration data as well as user data. NVM 118 can be flash memory or internal flash memory used to store configuration data and/or user data.

Controller 112 is a component residing in FPGA for handling various functions. In one embodiment, controller 112 is a multi-mode controller ("MMC") capable of electing or selecting one of the protocol modes. A function of controller 112 is to differentiate the current transmission mode. For example, controller 112 is able to identify whether the data transmission mode is I2C or I3C. It should be noted that I2C transmission speed is approximately 400 kilohertz ("KHz") and I3C transmission speed is approximately 12 megahertz ("MHz"). In one aspect, controller 112 is capable of differentiating I3C from I2C, I3C, SPI, Joint Test Action Group ("JTAG"), and TWI.

The SPI bus or SPI is a synchronous serial communication interface specification used for short-distance communication, such as in embedded systems. In one example, SPI devices communicate in full-duplex mode using a master-slave architecture with a single master. The master device originates frames for reading and writing. It should be noted that SPI can also be referred to as a four-wire serial bus, as opposed to three-, two-, and one-wire serial buses.

JTAG uses four to five pins to implement on-chip digital simulation for various purposes such as debugging process. JTAG uses facilitates serial communications with relatively low-overhead access without requiring access to system address and data buses.

SMC 146 includes SDA 162 and SCL 160 wherein SDA 162 and SCL 160, in one example, are wires, connections, or channels extending to one or more masters and slaves as indicated by numeral 166-168. SDA 162 is a two-directional address/data line while SCL 160 is a unidirectional clock line. SMC 146, in one embodiment, includes two lines 160-162 wherein the first ends of lines 160-162 are connected to two pins 150-152 of master 102. The second ends of lines 160-162 are connected to two pins 156-158 of slave 106. SMC 146, in one aspect, is capable of transmitting configuration data from master 102 to slave 1 via I2C or I3C.

I2C is a communication protocol which typically is used on-board for short distances and relatively low bandwidth. I2C provides a master-slave operation via two lines, namely SDA and SCL. Upon issuing a start condition, the master sends an address of a slave device intended to communicate. After identifying read/write function, the intended slave begins to receive or send data via SDA and SCL. It should be noted that each byte of data is acknowledged by the receiver with either acknowledge ("ACK") or non-acknowledge ("NAK") signals to tell the sender whether the data has been received or not.

I3C, also known as MIPI I3C and SenseWire, is a communication protocol which is an improved interface mechanism while compatible with I2C. I3C devices support higher data rate which is similar to SPI. I3C mode can be used to facilitate one or more master devices connected to one or more slaves via a bus. In one example, I3C has a data transmission rate up to 12 MHz It should be noted that both I2C and I3C modes are operating via 2-pin interfaces. While SCL carries clock signals generated by Master, SDA carries data. Noted that SDA is a bi-directional two wire bus with ACK function.

In operation, master 102, which can be a memory, transmits information via SDA 162 using I3C mode with corresponding I3C clock signals on SCL 160. The information, for example, identifies slave address such as slave1, transmission mode such as I3C, and destination such as NVM 118. Upon receiving the information, slave1 or slave 106 issues an ACK signal on SDA 162 to indicate the receipt of information.

A configurable semiconductor device or system, in one embodiment, able to process information includes a storage, an SMC, and a PIC. The storage stores at least one version of configuration data provided by a user to perform user-defined logic functions. In one example, the storage is an external storage device configured to store configuration data received from a user. SMC can be configured to transmit information via one of multiple transmission modes. SMC, for example, is able to switch a transmission protocol between an I2C mode and I3C mode. SMC is a two-wire bus containing a bi-directional SDA and SCL.

PIC, having configurable logic blocks ("LBs") and a configuration memory for facilitating user-defined logic functions, is configured to include an MMC for facilitating electing between multiple modes in response to mode information carried by at least a portion of address bits of SMC. PIC, in one example, is an FPGA capable of performing logic functions based on configuration data stored in the configuration memory. MMC, in one example, is configured to be an I3C mode when address bits of SDA indicate I3C protocol. Alternatively, MMC can be configured to be an I2C mode when address bits of SDA indicate I2C protocol. MMC can also be configured to forward received data to an embedded flash memory in the PIC via SMC which is configured to be in the I3C mode.

One advantage of employing HMS is that it enhances transmission speed when I3C mode is used.

Figure 2:
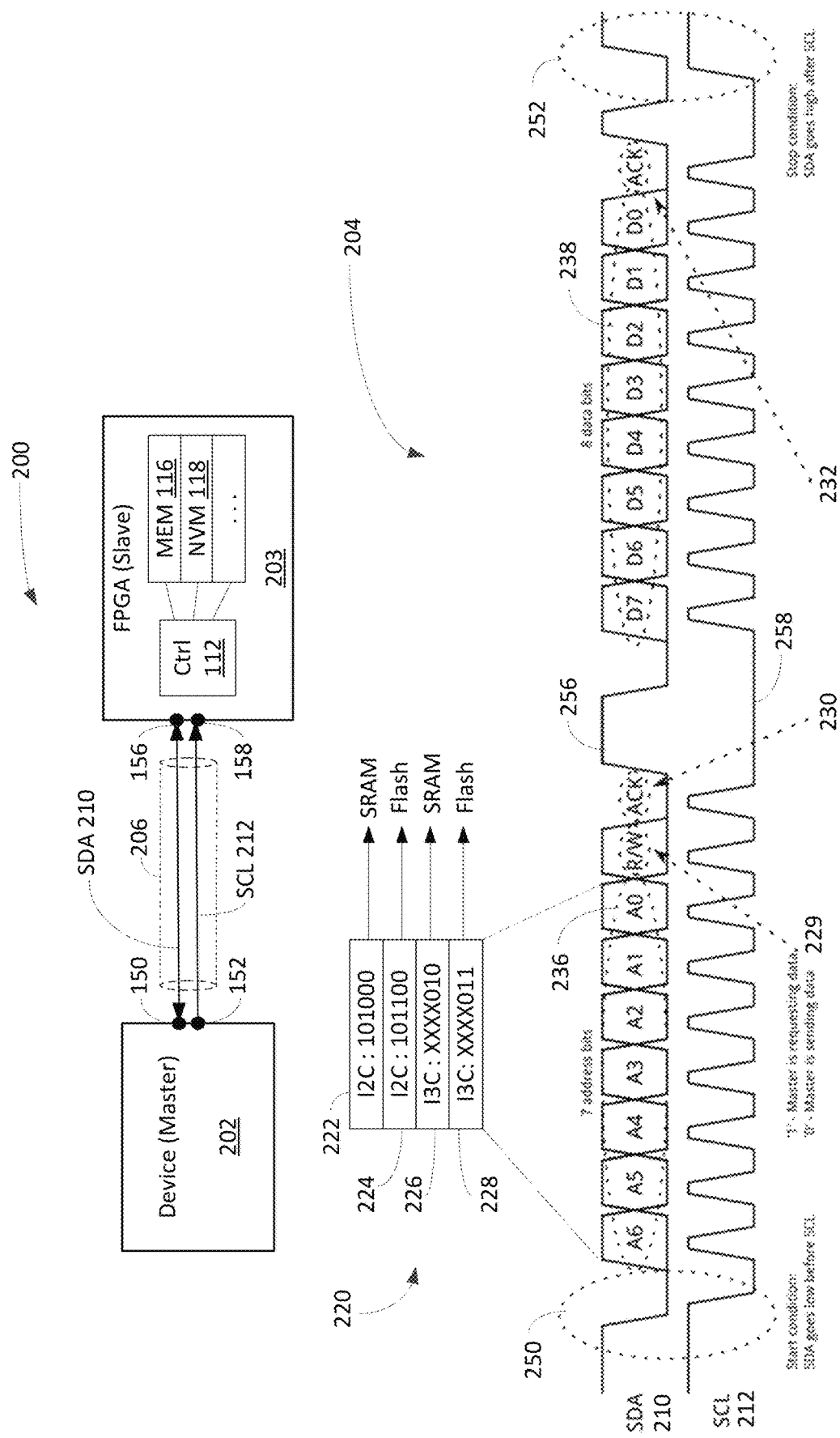
FIG. 2 is a block diagram illustrating a system containing a master and a slave connected via HMC facilitating I2C or I3C transmissions in accordance with one embodiment of the present invention.

FIG. 2 is a block diagram 200 illustrating a system containing master devices and slave devices connected via SMC facilitating I2C or I3C transmissions in accordance with one embodiment of the present invention. It should be noted that I2C transmission, I2C communication protocol, and/or I2C mode are referring the same or similar reference. Diagram 200 includes a device 202 as master, FPGA 203 as slave, and SMC 206 which is used to couple device 202 to FPGA 203 or vice versa. SMC 206 includes SDA 210 and SCL 212. It should be noted that the underlying concept of the exemplary embodiment(s) of the present invention would not change if one or more blocks (circuit or elements) were added to or removed from diagram 200.

Device 202, in one example, can be a processor, memory storage, and/or a programmable device capable of providing configuration bit streams. A function of device 202 is to provide configuration data to FPGA 203. In one aspect, device 202 includes two ports 150-152 used to couple to SMC 206. Device 202 is configured to transmit configuration data using various modes, such as I2C, I3C, SPI, and UART. In one embodiment, device 202 can be a hardware chip, die, device, module, IC, and/or a portion of FPGA.

FPGA 203 includes controllers 112, PLBs, volatile memory 116, and NVM 118. In one aspect, FPGA 203 includes two ports 156-158 which are used to couple to SMC 206. PLBs of FPGA can be programmed via configuration data to perform user defined functions. Memory, such as NVM 118, can be used to store the configuration data transmitted from device 202 via SMC 206.

SMC 206 includes SDA 210 and SCL 212 wherein SDA 210 is used to link device 202 and FPGA 203 via ports 150 and 156. SCL 212 is used to link device 202 to FPGA 203 via ports 152 and 158. A function of SMC 206 is to efficiently transmit configuration data formulated into a bit stream from device 202 to FPGA 203. In one embodiment, SMC 206 can be configured to use one of multiple modes for transmission. In another embodiment, SMC 206 can transmit configuration data using a high-speed transmission protocol such as I3C.

Diagram 200 also includes a timing diagram 204 illustrating signal waveforms showing relationship between SDA 210 and SCL 212 operating under I2C or I3C. While waveform 256 illustrates signals on SDA 210, waveform 258 represents clock signals on SCL 212. For SDA 210, the signals represented by waveform 256 are divided into two portions wherein the first portion is address frame 236 and the second portion is data frame 238. Address frame 236, in one example, indicates where device 202 indicates FPGA 203 to which the information or data should be sent. Address frame 236, in one example, includes 7 address bits with one read/write ("R/W") bit 229 and one ACK bit 230. Data frame 238 includes 8 data bits with one ACK bit 232. The data carried by SDA which is bi-directional is passed from device 202 to FPGA 203 or from FPGA 203 to device 202 depending on the value of R/W bit 229. It should be noted that the data is usually placed on SDA 210 after clock signals on SCL go low, and the data is sampled after clock signals on SCL go high.

In operation, upon initiating address frame 236, device 202 drives SCL 212 high and pulls SDA 210 low which broadcasts to all slave devices such as FPGA 203 that a transmission is about to start as indicated by numeral 250. Address frame 236 usually comes first in a new communication sequence. For example, a 7-bit address followed by a R/W bit 229 indicating whether this is a read (1) or write (0) operation. For example, a logic one value of R/W bit 229 indicates a data transmission from FPGA 203 to device 202. A logic zero value of R/W bit 229 indicates a data transmission from device 202 to FPGA 203. The 9th bit 230 following R/W bit 229 is a NACK/ACK bit. After sending the first 8 bits of frame, FPGA 203, as a receiving device, is given control over SDA 210. If FPGA 203 does not pull SDA low based on the 9th clock signal, it indicates that FPGA 203 has not received the information of the first 8 bits of frame. Once frame 236 has been sent and ACK bit 230 is activated (or low), device 203 begins to transmit data frame 238. Upon sending data frame 238, device 202 facilitates a stop condition 252 after receiving the acknowledgement via ACK bit 232.

In one embodiment, HMS illustrated in diagram 200 employs the I2C or I3C transmission protocol to transmit the configuration data to FPGA 203. It should be noted that I2C and I3C Masters such as device 202 use the same pin configurations for driving slaves such as FPGA 203. FPGA 203 as a slave device contains SRAM fuse array and flash memory for storing configuration data. In one example, the master device such as device 202 can instruct the slave device such as FPGA 203 where the configuration data should be stored. For instance, device 202 can instruct FPGA 203 to store the configuration data in SRAM fuse array or flash memory using address frame 236.

Diagram 200 shows a table 220 illustrating an exemplary set of addresses allowing device 202 to instruct FPGA 203 regarding storage location of the configuration data. For example, when address frame 236 contains a value of "101000" during I2C mode as indicated by numeral 222, SRAM fuse array of FPGA 203 is the destination of configuration data. When address frame 236 contains a value of "101100" during I2C mode as indicated by numeral 224, flash memory of FPGA 203 is the destination of configuration data. When address frame 236 contains a value of "XXXX010" during I3C mode as indicated by numeral 226, SRAM fuse array of FPGA 203 is the destination of configuration data. It should be noted that the letter "X" in address frame indicates a condition of "don't care". When address frame 236 contains a value of "XXXX011" during I3C mode as indicated by numeral 228, flash memory of FPGA 203 is the destination of configuration data.

One advantage of employing HMC is that it enhances configuration data transmission using multiple modes.

Figure 3:
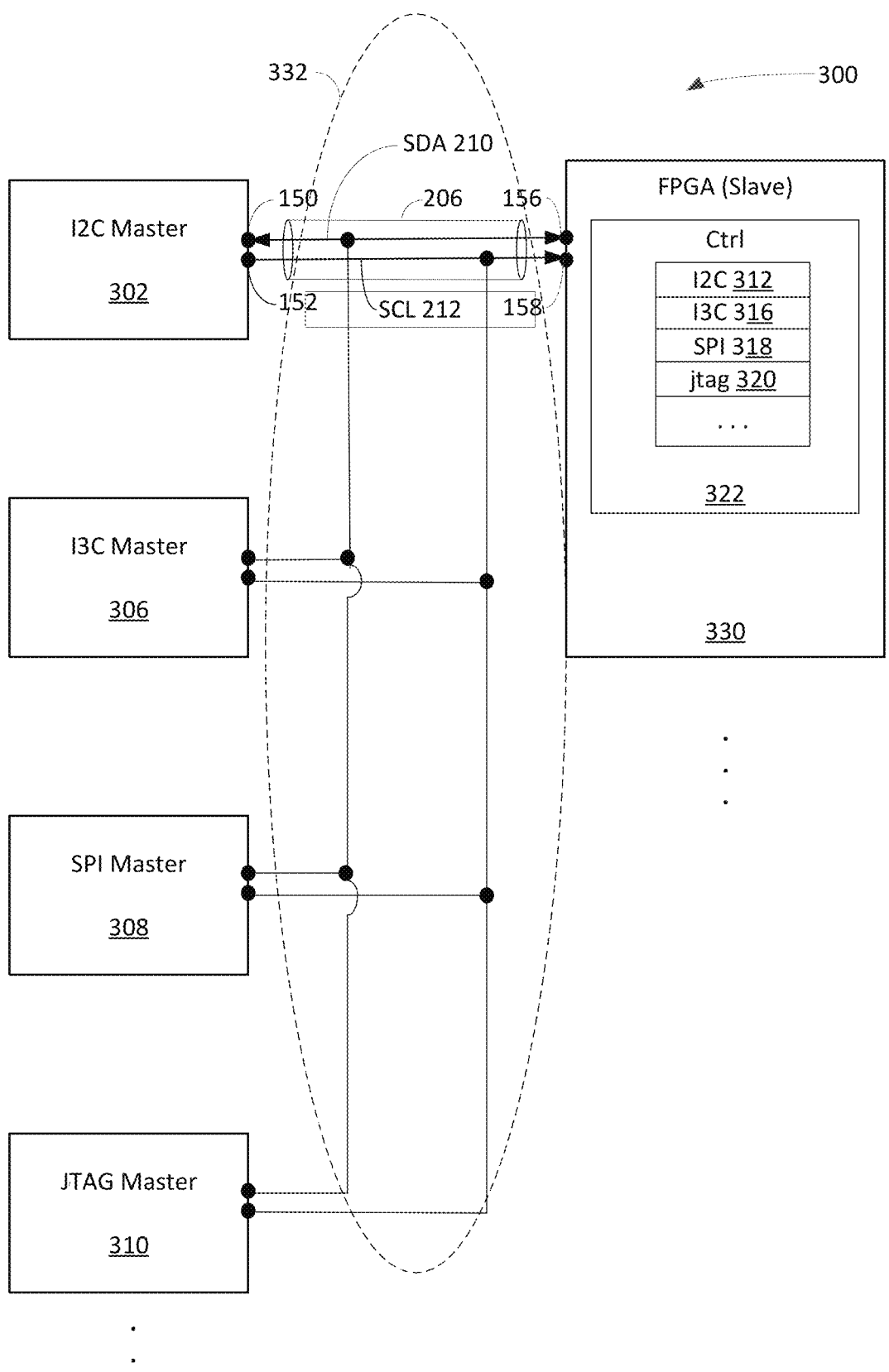
FIG. 3 is a block diagram illustrating an exemplary hybrid mode system ("HMS") containing master devices and slave device(s) connected by HMC capable of facilitating data transmissions via one of the multiple modes in accordance with one embodiment of the present invention.

FIG. 3 is a block diagram 300 illustrating an exemplary HMS containing master devices and slave device(s) connected by HMC capable of facilitating data transmissions via one of the multiple modes in accordance with one embodiment of the present invention. Diagram 300 includes master devices 302-310, slave device 330, and HMC 332. HMC 332, in one aspect, can be two-wire communication bus for facilitating I2C and/or I3C. HMC 332, in an alternative embodiment, can also be configured to include additional wires for facilitating data transmission(s) via other types of communication protocols such as SPI and JTAG. It should be noted that the underlying concept of the exemplary embodiment(s) of the present invention would not change if one or more blocks (circuit or elements) were added to or removed from diagram 300.

Master devices 302-310 includes an I2C master device 302, I3C master device 306, SPI master device 308, and JTAG master device 310. In one aspect, master devices can include additional devices capable of facilitating one or more communication protocols. HMS, in one embodiment, allows any one of master devices 302-310 to drive or communicate to one or more slave devices such as FPGA 330. When I2C master device 302, for example, obtains a permission to drive FPGA 330, I2C master device 302 transmits data or configuration data to FPGA 330 via HMC 332 using I2C communication protocol. When I3C master device 306, however, obtains the permission to drive FPGA 330, I3C master device 306 transmits data or configuration data to FPGA 330 via HMC 332 using I3C communication protocol. Also, when SPI master device 308 receives the permission to drive FPGA 330, SPI master device 308 transmits data or configuration data to FPGA 330 via HCM 332 using SPI communication protocol. Moreover, when JTAG master device 310 captures the permission to drive FPGA 330, JTAG master device 310 transmits data or configuration data to FPGA 330 via HMC 332 using JTAG communication protocol.

FPGA 330, in one example, is configured as a slave device and contains a multi-mode controller ("MMC") 322. MMC 322, in one aspect, includes an I2C interface unit 312, I3C interface unit 316, SPI interface unit 318, and JTAG interface unit 320. Upon identifying the type of transmission protocol, one of I2C, I3C, SPI, and JTAG interface units is activated by MMC 322 to handle the data transmission from master to slave or vice versa. For example, when MMC 322 identifies that the data transmitted on HMC 332 is based on I3C protocol, I3C interface unit 316 is active for handling the interface.

An advantage of using FPGA containing MMC 322 is that MMC 322 allows different master devices with different communication protocols to communicate with FPGA 330.

In operation, the HMS process containing a master device and a PLD as a slave device facilitating transmission of configuration data via a SMC is capable of detecting an I3C mode in accordance with at least a portion of address bits on SDA which is used to couple the PLD to the external storage. Upon configuring an MMC to facilitate the I3C mode for processing data from the SDA in accordance with I3C clock cycles carried over a SCL, the HMS process transmits the configuration data from the external storage to a configuration storage in PLD via SDA in response to the clock cycles.

Figure 4:
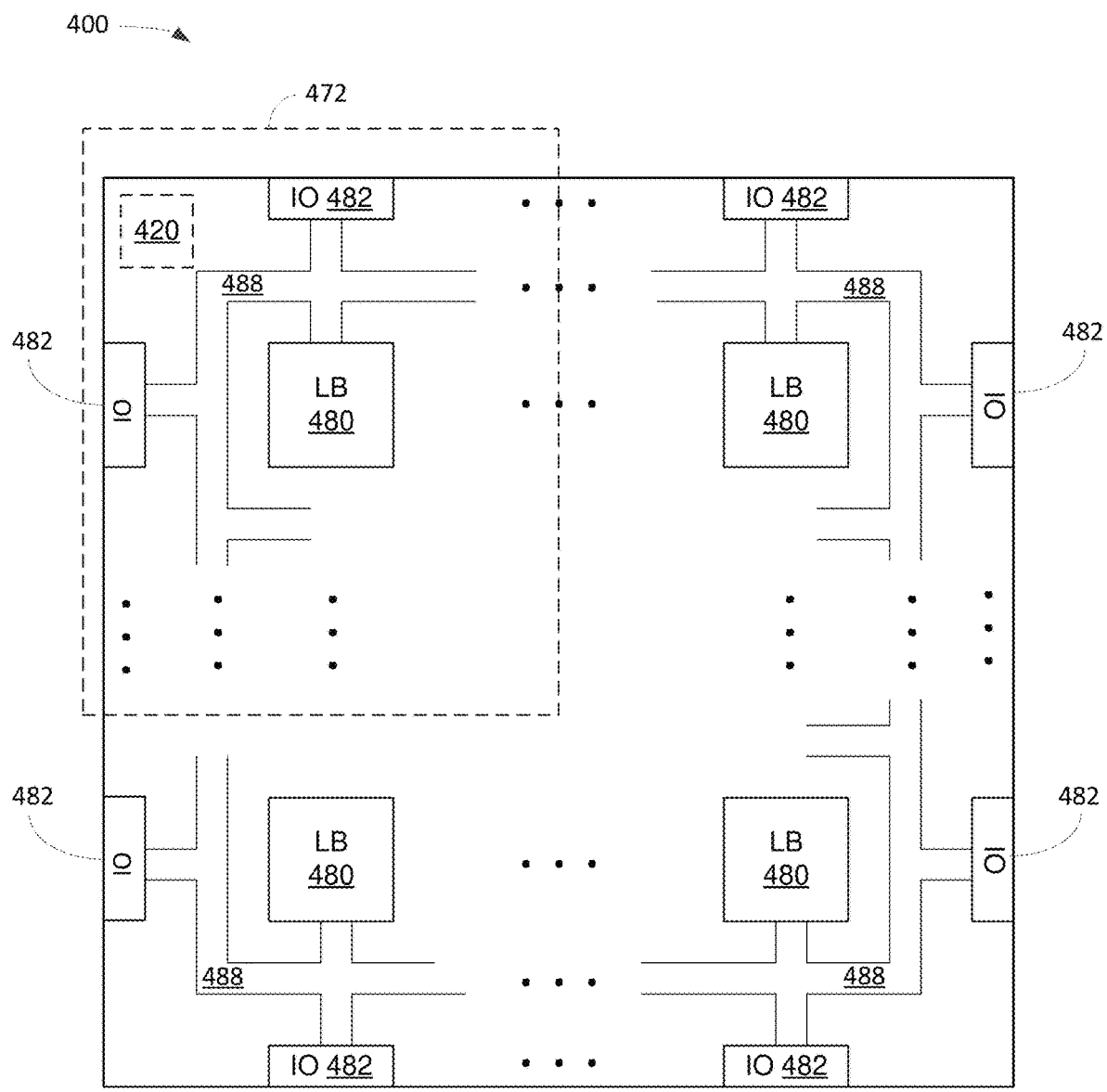
FIGS. 4-6 are block diagrams illustrating a programmable semiconductor device ("PSD") or FPGA capable of enhancing configuration data transmission rate using HMC in accordance with one embodiment of the present invention.

FIG. 4 is a block diagram illustrating a programmable semiconductor device ("PSD") 400 capable of being assigned as a slave device capable of handling an enhanced transmission rate using HMC in accordance with one embodiment of the present invention. PSD 400, also known as FPGA, PIC, and/or a type of Programmable Logic Device ("PLD"), includes an MMC 420 capable of facilitating multi-mode data transmission. A function of MMC 420 is to improve flexibility of PIC for communicating with one or more master devices. It should be noted that the underlying concept of the exemplary embodiment(s) of the present invention would not change if one or more blocks (circuit or elements) were added to or removed from diagram FIG. 4.

PSD 400 includes an array of configurable LBs 480 surrounded by input/output blocks ("IOs") 482, and programmable interconnect resources 488 ("PIR") that include vertical interconnections and horizontal interconnections extending between the rows and columns of LB 480 and IO 482. PRI 488 may further include interconnecting array decoders ("IAD") or programmable interconnection array ("PIA"). It should be noted that the terms PRI, IAD, and PIA may be used interchangeably hereinafter.

Each LB, in one example, includes programmable combinational circuitry and selectable output registers programmed to implement at least a portion of a user's logic function. The programmable interconnections, connections, or channels of interconnect resources are configured using various switches to generate signal paths between the LBs 480 for performing logic functions. Each IO 482 is programmable to selectively use an I/O pin (not shown) of PSD.

PIC, in one embodiment, can be divided into multiple programmable partitioned regions ("PPRs") 472 wherein each PPR 472 includes a portion of LBs 480, some PPRs 488, and IOs 482. A benefit of organizing PIC into multiple PPRs 472 is to optimize management of storage capacity, power supply, and/or network transmission.

Bitstream is a binary sequence (or a file) containing programming information or data for a PIC, FPGA, or PLD. The bitstream is created to reflect the user's logic functions together with certain controlling information. For an FPGA or PLD to function properly, at least a portion of the registers or flipflops in FPGA needs to be programmed or configured before it can function. It should be noted that bitstream is used as input configuration data to FPGA.

Figure 5:
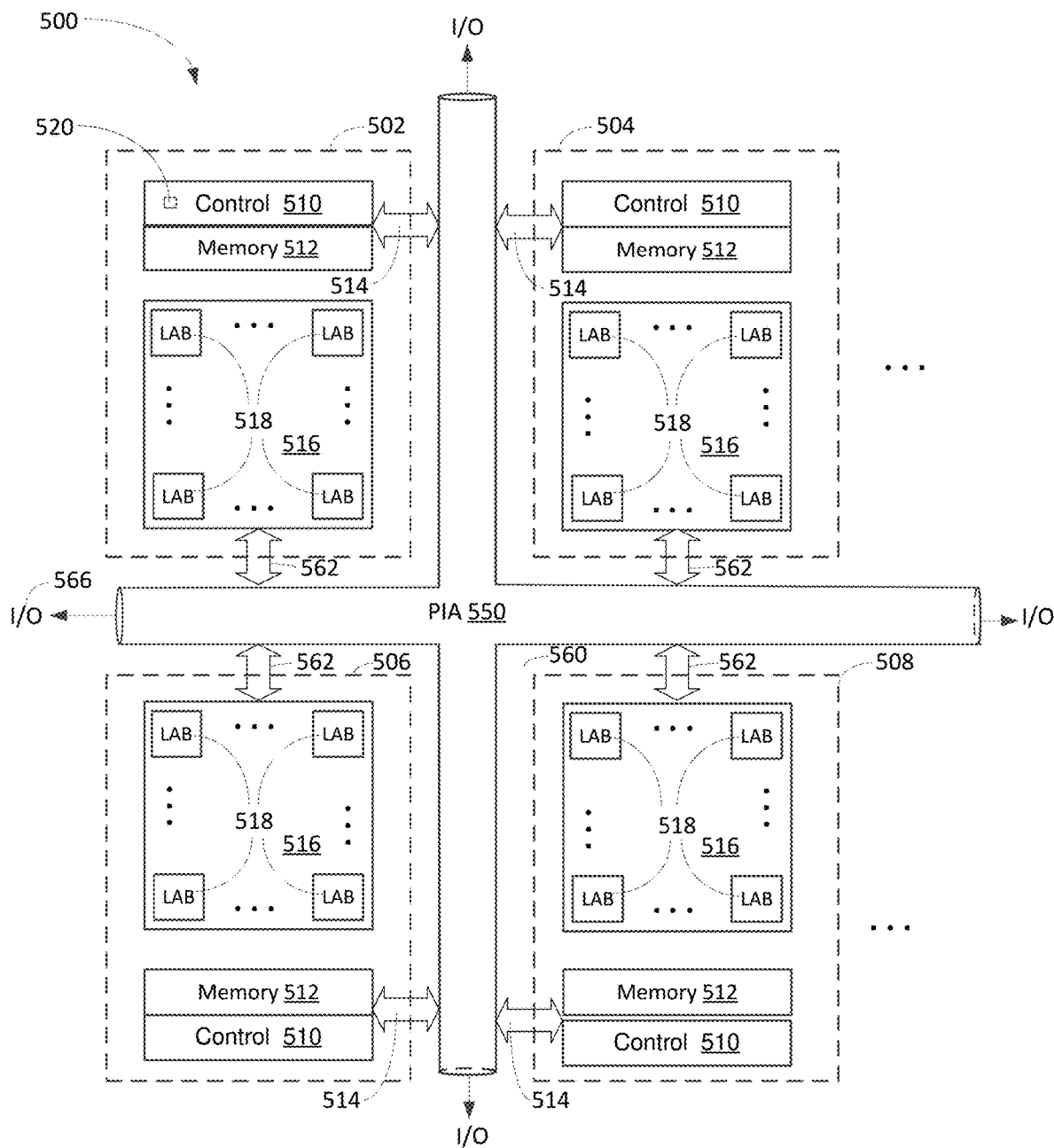

FIG. 5 is a block diagram 500 illustrating a PSD capable of enhancing configuration data transmission rate using HMC in accordance with one embodiment of the present invention. To simplify the foregoing discussion, the terms "PSD", "PIC", FPGA, and PLD are referring the same or similar devices and they can be used interchangeably hereinafter. Diagram 500 includes multiple PPRs 502-508, PIA 550, and regional I/O ports 566. PPRs 502-508 further includes control units 510, memory 512, and LBs 516. Note that control units 510 can be configured into one single control unit, and similarly, memory 512 can also be configured into one single memory for storing configurations. It should be noted that the underlying concept of the exemplary embodiment(s) of the present invention would not change if one or more blocks (circuit or elements) were added to or removed from diagram 500.

LBs 516, also known as configurable function unit ("CFU") include multiple LAB s 518 which is also known as a configurable logic unit ("CLU"). Each LAB 516, for example, can be further organized to include, among other circuits, a set of programmable logical elements ("LEs"), configurable logic slices ("CLS"), or macrocells, not shown in FIG. 5. Each LAB, in one example, may include anywhere from 32 to 512 programmable LEs. I/O pins (not shown in FIG. 5), LABs, and LEs are linked by PIA 550 and/or other buses, such as buses 562 or 514, for facilitating communication between PIA 550 and PPRs 502-508.

Each LE includes programmable circuits such as the product-term matrix, lookup tables, and/or registers. LE is also known as a cell, configurable logic block ("CLB"), slice, CFU, macrocell, and the like. Each LE can be independently configured to perform sequential and/or combinatorial logic operation(s). It should be noted that the underlying concept of PSD would not change if one or more blocks and/or circuits were added or removed from PSD.

Control units 510, also known as configuration logics, can be a single control unit. Control unit 510, for instance, manages and/or configures individual LE in LAB 518 based on the configuring information stored in memory 512. It should be noted that some I/O ports or I/O pins are configurable so that they can be configured as input pins and/or output pins. Some I/O pins are programmed as bi-directional I/O pins while other I/O pins are programmed as unidirectional I/O pins. The control units such as unit 510 are used to handle and/or manage PSD operations in accordance with system clock signals.

LBs 516 include multiple LABs that can be programmed by the end-user(s). Each LAB contains multiple LEs wherein each LE further includes one or more lookup tables ("LUTs") as well as one or more registers (or D flip-flops or latches). Depending on the applications, LEs can be configured to perform user-specific functions based on a predefined functional library facilitated by the configuration software. PSD, in some applications, also includes a set fixed circuit for performing specific functions. For example, the fixed circuits include, but not limited to, a processor(s), a DSP (digital signal processing) unit(s), a wireless transceiver(s), and so forth.

PIA 550 is coupled to LBs 516 via various internal buses such as buses 514 or 562. In some embodiments, buses 514 or 562 are part of PIA 550. Each bus includes channels or wires for transmitting signals. It should be noted that the terms channel, routing channel, wire, bus, connection, and interconnection are referred to as the same or similar connections and will be used interchangeably herein. PIA 550 can also be used to receive and/or transmits data directly or indirectly from/to other devices via I/O pins and LAB s.

Memory 512 may include multiple storage units situated across a PPR. Alternatively, memories 512 can be combined into one single memory unit in PSD. In one embodiment, memory 512 is an NVM storage unit used for both configuration as well as user memory. The NVM storage unit can be, but not limited to, MRAM, flash, Ferroelectric RAM, and/or phase changing memory (or chalcogenide RAM). Depending on the applications, a portion of the memory 512 can be designated, allocated, or configured to be a block RAM ("BRAM") used for storing large amounts of data in PSD.

A PSD includes many programmable or configurable LBs 516 that are interconnected by PIA 550, wherein each programmable LB is further divided into multiple LAB s 518. Each LAB 518 further includes many LUTs, multiplexers and/or registers. During configuration, a user programs a truth table for each LUT to implement a desired logical function. It should be noted that each LAB, which can be further organized to include multiple logic elements ("LEs"), can be considered as a configurable logic cell ("CLC") or slice. For example, a four-input (16 bit) LUT receives LUT inputs from a routing structure (not shown in FIG. 5). Based upon the truth table programmed into LUT during configuration of PSD, a combinatorial output is generated via a programmed truth table of LUT in accordance with the logic values of LUT inputs. The combinatorial output is subsequently latched or buffered in a register or flip-flop before the clock cycle ends.

In one embodiment, control unit 510 includes an MMC 520. It should be noted that MMC 520 can be placed anywhere within PIC or PSD for facilitating the HMS process. A function of MMC 520 is to interface SMC for handling data transmission formatted to one of multiple modes of communication protocols. A benefit of using MMC 520 is to allow multiple masters or master devices to drive PSD.

Figure 6:
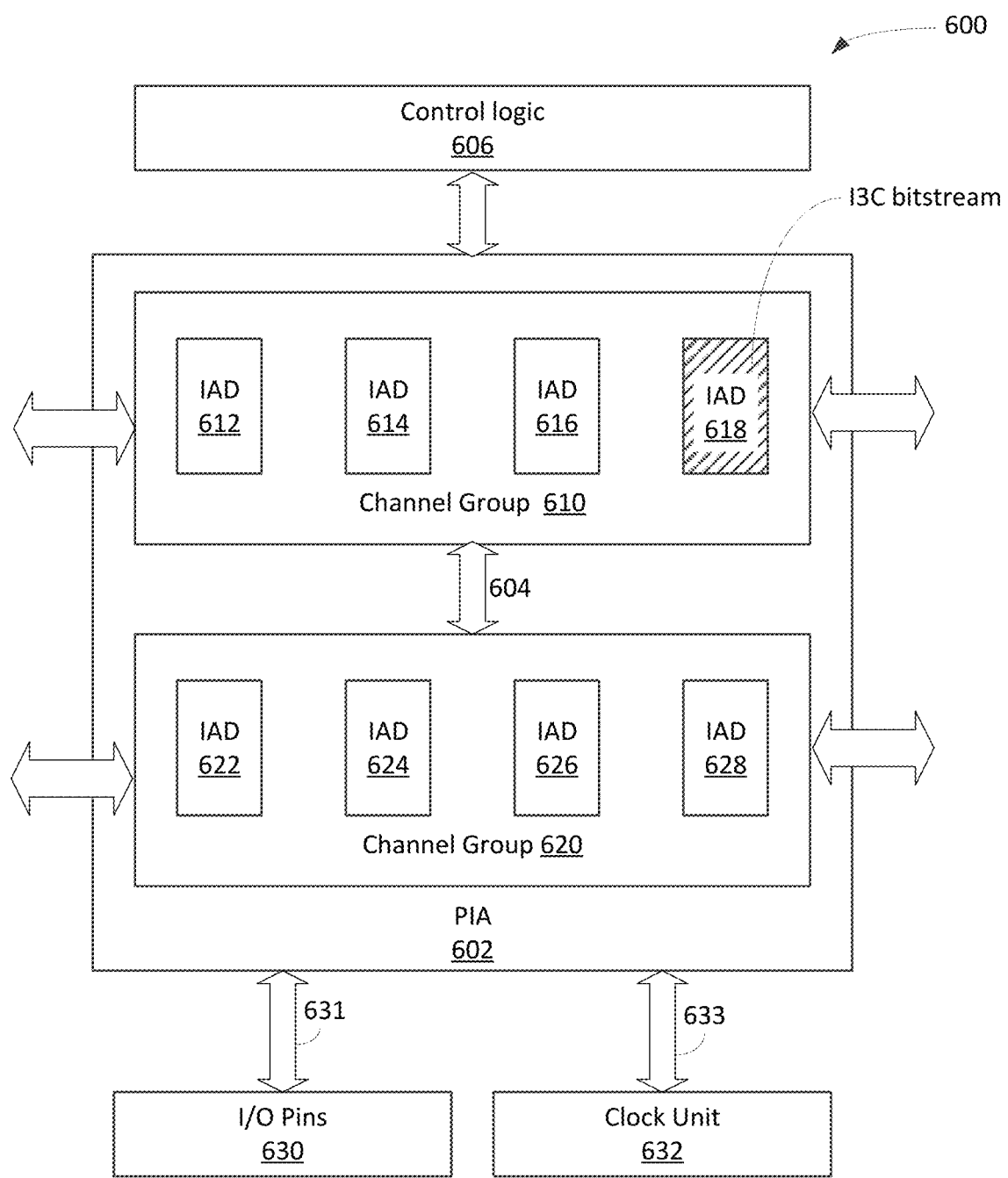

FIG. 6 is a block diagram 600 illustrating a routing logic or routing fabric containing programmable interconnection arrays capable of facilitating configuration data transmission using HMC in accordance with one embodiment of the present invention. Diagram 600 includes control logic 606, PIA 602, I/O pins 630, and clock unit 632. Control logic 606, which may be similar to control units shown in FIG. 5, provides various control functions including channel assignment, differential I/O standards, and clock management. Control logic 606 may contain volatile memory, non-volatile memory, and/or a combination of the volatile and nonvolatile memory device for storing information such as configuration data. In one embodiment, control logic 606 is incorporated into PIA 602. It should be noted that the underlying concept of the exemplary embodiment(s) of the present invention would not change if one or more blocks (circuit or elements) were added to or removed from diagram 600.

I/O pins 630, connected to PIA 602 via a bus 631, contain many programmable I/O pins configured to receive and/or transmit signals to external devices. Each programmable I/O pin, for instance, can be configured to input, output, and/or bi-directional pin. Depending on the applications, I/O pins 630 may be incorporated into control logic 606.

Clock unit 632, in one example, connected to PIA 602 via a bus 633, receives various clock signals from other components, such as a clock tree circuit or a global clock oscillator. Clock unit 632, in one instance, generates clock signals in response to system clocks as well as reference clocks for implementing I/O communications. Depending on the applications, clock unit 632, for example, provides clock signals to PIA 602 including reference clock(s).

PIA 602, in one aspect, is organized into an array scheme including channel groups 610 and 620, bus 604, and I/O buses 114, 124, 134, 144. Channel groups 610, 620 are used to facilitate routing information between LBs based on PIA configurations. Channel groups can also communicate with each other via internal buses or connections such as bus 604. Channel group 610 further includes interconnecting array decoders ("IADs") 612-618. Channel group 620 includes four IADs 622-628. A function of IAD is to provide configurable routing resources for data transmission.

IAD such as IAD 612 includes routing multiplexers or selectors for routing signals between I/O pins, feedback outputs, and/or LAB inputs to reach their destinations. For example, an IAD can include up to 36 multiplexers which can be laid out in four banks wherein each bank contains nine rows of multiplexers. It should be noted that the number of IADs within each channel group is a function of the number of LEs within the LAB.

PIA 602, in one embodiment, designates a special IAD such as IAD 618 for facilitating routing and interfacing configuration data transmitted via I3C bitstream. For example, IAD 618 is designated to handle connections and/or routings configuration information during bitstream transmission.

An advantage of using IAD 618 within PIA as a designated bitstream routing is to ascertain the transmission of configuration bitstream from I3C transmission channel.

Figure 7:
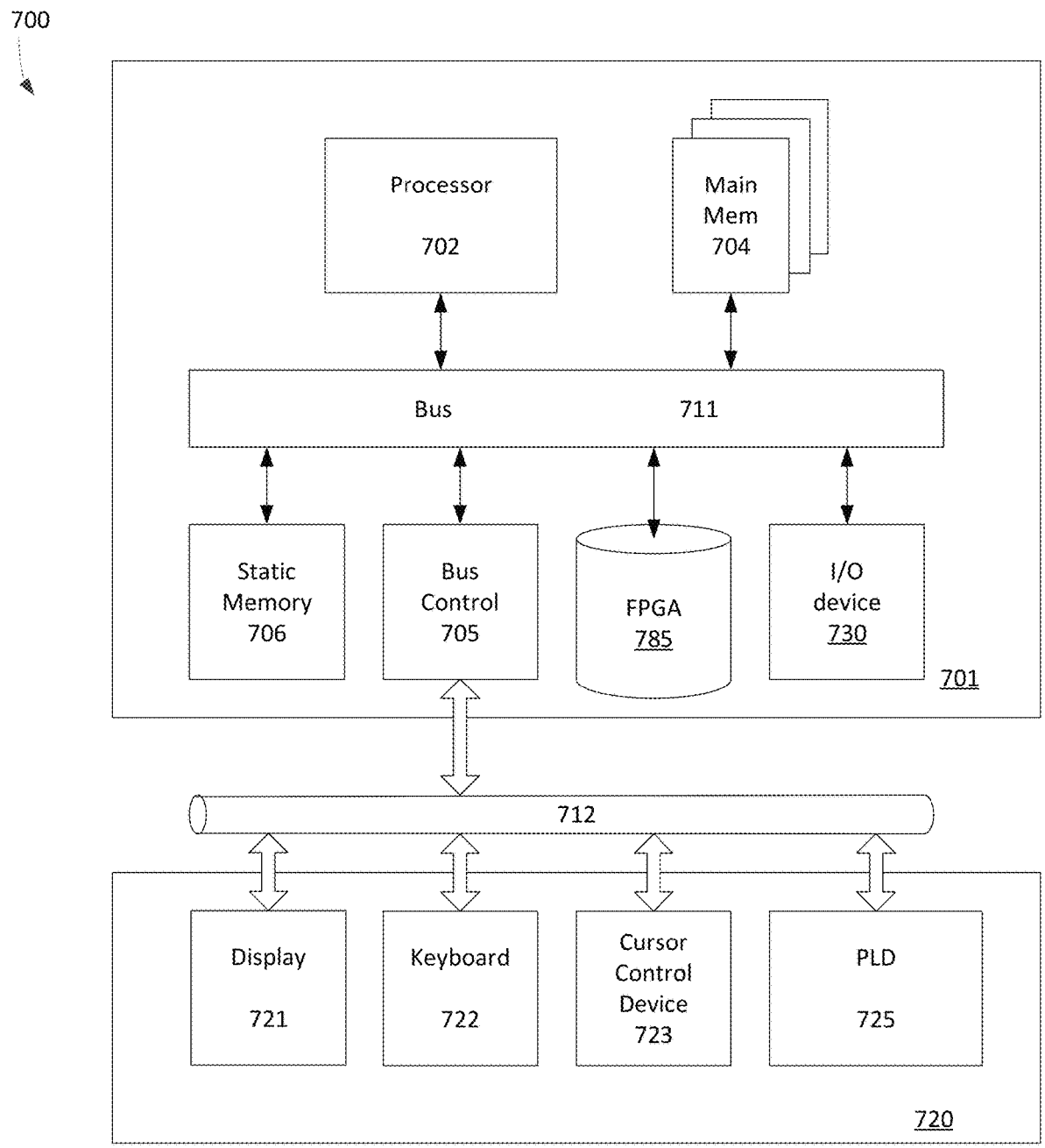
FIG. 7 is a diagram illustrating a system or computer using FPGA able to provide an HMC process to enhance programmability of FPGA in accordance with one embodiment of the present invention.

FIG. 7 is a diagram illustrating 700 a system or computer using FPGA able to provide an HMC process to enhance programmability of FPGA in accordance with one embodiment of the present invention. Computer system 700 includes a processing unit 701, an interface bus 712, and an input/output ("TO") unit 720. Processing unit 701 includes a processor 702, main memory 704, system bus 711, static memory device 706, bus control unit 705, I/O element 730, and FPGA 785. It should be noted that the underlying concept of the exemplary embodiment(s) of the present invention would not change if one or more blocks (circuit or elements) were added to or removed from FIG. 7.

Bus 711 is used to transmit information between various components and processor 702 for data processing. Processor 702 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 704, which may include multiple levels of cache memories, stores frequently used data and instructions. Main memory 704 may be RAM (random access memory), MRAM (magnetic RAM), or flash memory. Static memory 706 may be a ROM (read-only memory), which is coupled to bus 711, for storing static information and/or instructions. Bus control unit 705 is coupled to buses 711-712 and controls which component, such as main memory 704 or processor 702, can use the bus. Bus control unit 705 manages the communications between bus 711 and bus 712. Mass storage memory or SSD which may be a magnetic disk, an optical disk, hard disk drive, floppy disk, CD-ROM, and/or flash memories are used for storing large amounts of data.

I/O unit 720, in one embodiment, includes a display 721, keyboard 722, cursor control device 723, and low-power PLD 725. Display device 721 may be a liquid crystal device, cathode ray tube ("CRT"), touch-screen display, or other suitable display devices. Display 721 projects or displays images of a graphical planning board. Keyboard 722 may be a conventional alphanumeric input device for communicating information between computer system 700 and computer operator(s). Another type of user input device is cursor control device 723, such as a conventional mouse, touch mouse, trackball, or other types of the cursor for communicating information between system 700 and user(s).

PLD 725 is coupled to bus 712 for providing configurable logic functions to local as well as remote computers or servers through a wide-area network. PLD 725 and/or FPGA 785 are configured to facilitate the operation of the HMS process to facilitate various transmission modes for transmitting configuration data from a master device to a slave device. Computer system 700 may be coupled to servers via a network infrastructure as illustrated in the following discussion.

Figure 8:
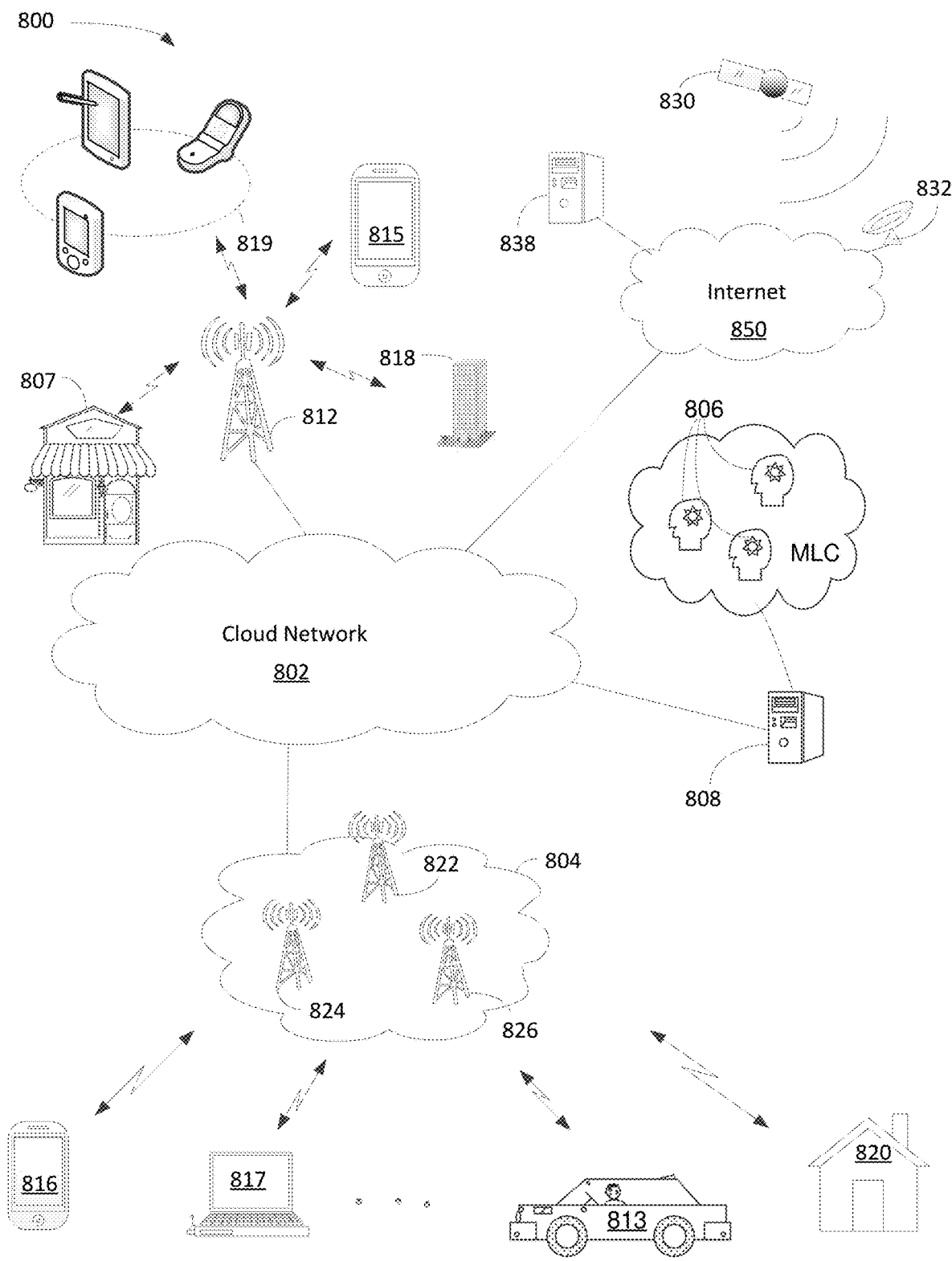
FIG. 8 is a block diagram illustrating various applications of PSS or PSD containing FPGA or PLD capable of facilitating various transmission modes for transmitting configuration data from a master device to a slave device an HMS process in accordance with one embodiment of the present invention.

FIG. 8 is a block diagram 800 illustrating various applications of FPGA or PLD capable of facilitating various transmission modes for transmitting configuration data from a master device to a slave device an HMS process in accordance with one embodiment of the present invention. Diagram 800 illustrates AI server 808, communication network 802, switching network 804, Internet 850, and portable electric devices 813-819. In one aspect, FPGA is used in an AI server, portable electric devices, and/or switching network. Network or cloud network 802 can be a wide area network, metropolitan area network ("MAN"), local area network ("LAN"), satellite/terrestrial network, or a combination of a wide-area network, MAN, and LAN. It should be noted that the underlying concept of the exemplary embodiment(s) of the present invention would not change if one or more blocks (or networks) were added to or removed from diagram 800.

Network 802 includes multiple network nodes, not shown in FIG. 8, wherein each node may include mobility management entity ("MME"), radio network controller ("RNC"), serving gateway ("S-GW"), packet data network gateway ("P-GW"), or Home Agent to provide various network functions. Network 802 is coupled to Internet 850, AI server 808, base station 812, and switching network 804. Server 808, in one embodiment, includes machine learning computers ("MLC") 806.

Switching network 804, which can be referred to as packet core network, includes cell sites 822-826 capable of providing radio access communication, such as 3G ($3^{rd}$ generation), 4G, or 5G cellular networks. Switching network 804, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 804 is logically coupling multiple users and/or mobiles 816-820 across a geographic area via cellular and/or wireless networks. It should be noted that the geographic area may refer to campus, city, metropolitan area, country, continent, or the like.

Base station 812, also known as cell-site, node B, or eNodeB, includes a radio tower capable of coupling to various user equipments ("UEs") and/or electrical user equipments ("EUEs"). The term UEs and EUEs are referring to similar portable devices and they can be used interchangeably. For example, UEs or PEDs can be cellular phone 815, laptop computer 817, iPhone® 816, tablets, and/or iPad® 819 via wireless communications. A handheld device can also be a smartphone, such as iPhone®, BlackBerry®, Android®, and so on. Base station 812, in one example, facilitates network communication between mobile devices such as portable handheld device 813-819 via wired and wireless communications networks. It should be noted that base station 812 may include additional radio towers as well as other land switching circuitry.

Internet 850 is a computing network using Transmission Control Protocol/Internet Protocol ("TCP/IP") to provide linkage between geographically separated devices for communication. Internet 850, in one example, couples to supplier server 838 and satellite network 830 via satellite receiver 832. Satellite network 830, in one example, can provide many functions as wireless communication as well as a global positioning system ("GPS"). It should be noted that the HMS process can benefit many applications, such as but not limited to, smartphones 813-819, satellite network 830, automobiles 813, AI servers 808, business 807, and homes 820.

The exemplary embodiment of the present invention includes various processing steps, which will be described below. The steps of the embodiment may be embodied in machine or computer-executable instructions. The instructions can be used to cause a general-purpose or special-purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 9:
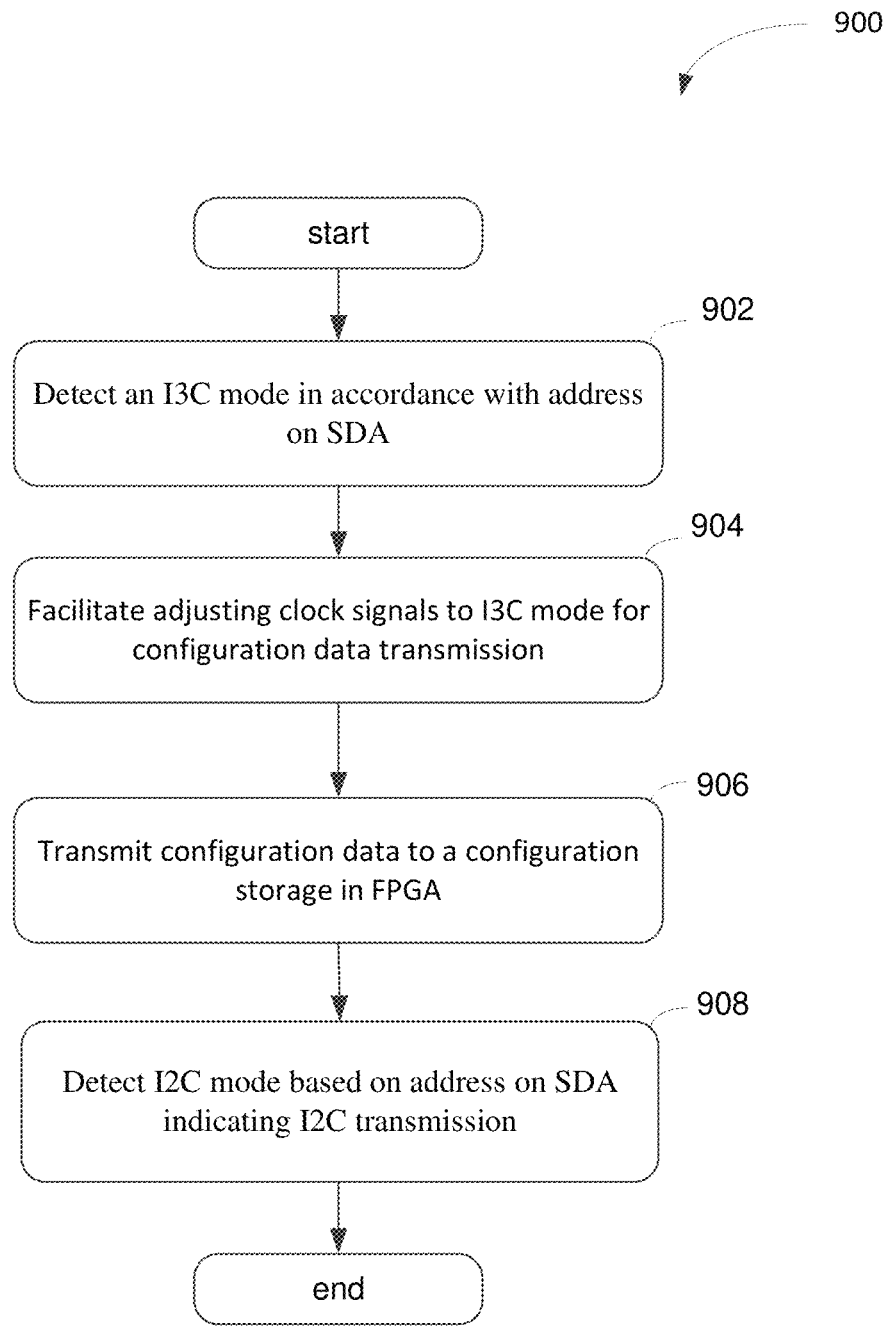
FIG. 9 is a flowchart illustrating a logic process of HMC capable of facilitating I2C or I3C transmissions in accordance with one embodiment of the present invention.

FIG. 9 is a flowchart 900 illustrating a logic process of HMC capable of facilitating I2C or I3C transmissions in accordance with one embodiment of the present invention. At block 902, a process, capable of providing configuration data to an FPGA (as a slave device) via an HMC, identifies a first communication protocol in accordance with at least a portion of address bits presented on SDA coupling FPGA to an external device. In one embodiment, the first communication protocol is I2C communication protocol when the least three significant bits of the address bits of SDA are set to logic zeros. Alternatively, the first communication protocol can be I3C communication protocol when the sixth bit of the address bits is set to logic one.

At block 904, the process adjusts receiving clock signals to a first clock frequency in accordance with the first communication protocol and clock cycles presented on SCL which couples FPGA (as a slave) to the external device (as a master). For example, upon detecting an I3C communication protocol and clock signals running at 12 MHz, an FPGA control unit detects I3C mode and activates I3C interface unit to handle the data transmission.

At block 906, the configuration data is transmitted from the external device to a configuration storage in FPGA via SDA in response to the first clock frequency. In one embodiment, the configuration data is transmitted from the external device to an onboard SRAM within FPGA via I2C communication protocol when the address bits have a binary number of "1010000". Alternatively, the configuration data is transmitted from the external device to an embedded flash memory in FPGA via I2C communication protocol when the address bits have a binary number of "1011000". The configuration data can also be transferred from the external device to an onboard SRAM within FPGA via I3C communication protocol when last three bits of the address bits have a binary number of "010". The configuration data can further be transferred or transmitted from the external device (or chip, die, etc.) to an embedded flash memory in FPGA via I3C communication protocol when last three bits of the address bits have a binary number of "011".

At block 908, the process is capable of programming at least a portion of FPGA to perform user-defined logic functions in response to the configuration data in the configuration storage. In one embodiment, the process is able to determine the destination memory locations of the configuration storage based on address bits on the SDA. Alternatively, the process can also determine the destination memory locations includes identifying an embedded flash memory as the destination memory location in response to least three significant bits of the address bits on the SDA. In one aspect, the process can also be configured to identify an embedded SRAM as the destination memory location in response to least three significant bits of the address bits on the SDA. Upon completing the first transmission such as an I3C transmission, the process is able to detect an I2C transmission after identifying an I2C mode over SDA.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for providing configuration data to a field-programmable gate array ("FPGA") via a hybrid communication channel, the method comprising:

coupling the FPGA to an external device via a bus containing a serial data line ("SDA") and a serial clock line ("SCL");

identifying a first communication protocol by a controller located inside of the FPGA in accordance with least significant three (3) bits of address bits presented on the SDA;

adjusting receiving clock signals of the FPGA to a first clock frequency in accordance with the first communication protocol and clock cycles presented on the SCL;

transmitting configuration data from the external device to a configuration storage in the FPGA via the SDA in response to the first clock frequency; and programming at least a portion of the FPGA to perform user-defined logic functions in response to the configuration data in the configuration storage.

2. The method of claim 1, further comprising determining destination memory locations of the configuration storage based on address bits on the SDA.

3. The method of claim 2, wherein the determining destination memory locations includes identifying an embedded flash memory as the destination memory location in response to least significant three (3) bits of the address bits on the SDA.

4. The method of claim 2, wherein the determining destination memory locations includes identifying an embedded static random-access memory ("SRAM") as the destination memory location in response to least significant three (3) bits of the address bits on the SDA.

5. The method of claim 1, wherein the identifying a first communication protocol includes determining an Inter-Integrated Circuit ("I2C") communication protocol for the SDA when least significant three (3) bits of the address bits are set to logic zeros.

6. The method of claim 1, wherein the identifying a first communication protocol includes determining an Improved Inter-Integrated Circuit ("I3C") communication protocol for the SDA when sixth bit from most significant bit of the address bits is set to logic one.

7. The method of claim 1, wherein the transmitting configuration data includes transferring the configuration data from the external device to an onboard static random-access memory ("SRAM") within the FPGA via an Inter-Integrated Circuit ("I2C") communication protocol when the address bits have a binary number of "1010000".

8. The method of claim 1, wherein the transmitting configuration data includes transferring the configuration data from the external device to an embedded flash memory in the FPGA via an Inter-Integrated Circuit ("I2C") communication protocol when the address bits have a binary number of "1011000".

9. The method of claim 1, wherein the transmitting configuration data includes transferring the configuration data from the external device to an onboard static random-access memory ("SRAM") within the FPGA via an Improved Inter-Integrated Circuit ("I3C") communication protocol when last three bits of the address bits have a binary number of "010".

10. The method of claim 1, wherein the transmitting configuration data includes transferring the configuration data from the external device to an embedded flash memory in the FPGA via an Improved Inter-Integrated Circuit ("I3C") communication protocol when last three bits of the address bits have a binary number of "011".

11. A configurable semiconductor device able to process information, comprising:
a storage configured to store at least one version of configuration data provided by a user to perform user-defined logic functions;
a selectable multi-mode channel ("SMC") containing a data wire and a clock wire coupled to the storage and configured to transmit information via one of multiple transmission modes; and
a programmable integrated circuit ("PIC"), having configurable logic blocks ("LBs") and a configuration memory for facilitating user-defined logic functions, configured to include a multi-mode controller ("MMC") coupled to the SMC for electing one mode from multiple modes for handling multiple communication protocols in response to mode information carried by least significant three (3) bits of the data wire.

12. The device of claim 11, wherein the storage is an external device remotely coupled to the PIC.

13. The device of claim 11, wherein the SMC is able to switch a transmission protocol between an Inter-Integrated Circuit ("I2C") and an Improved Inter-Integrated Circuit ("I3C").

14. The device of claim 11, wherein the PIC is a field-programmable gate array ("FPGA") capable of performing logic functions based on configuration data stored in the configuration memory.

15. The device of claim 11, wherein the SMC is a two-wire bus containing a bi-directional serial data line ("SDA") and a serial clock line ("SCL").

16. The device of claim 15, wherein the MMC is configured to be an Improved Inter-Integrated Circuit ("I3C") bus when address bits of the SDA indicate I3C protocol.

17. The device of claim 15, wherein the MMC is configured to be an Inter-Integrated Circuit ("I2C") bus when address bits of the SDA indicate I2C protocol.

18. The device of claim 11, wherein the MMC is configured to forward received data to an embedded flash memory in the PIC via the SMC which is capable of being set to an I3C mode.

19. A method for providing configuration data to a programmable logic device ("PLD") via a selectable multi-mode channel, the method comprising:
coupling the PLD to an external storage via a bus containing a serial data line ("SDA") and a serial clock line ("SCL");
detecting an Improved Inter-Integrated Circuit ("I3C") mode by a multi-mode controller ("MMC") of the PLD in accordance with least significant three (3) bits of address bits on the SDA;
configuring the MMC to the I3C mode for processing data from the SDA in accordance with I3C clock cycles carried over the SCL; and
transmitting configuration data from the external storage to a configuration storage in the PLD via the SDA in response to the I3C clock cycles operated by the PLD.

20. The method of claim 19, further comprising detecting an Inter-Integrated Circuit ("I2C") mode when the address bits on the SDA indicating an I2C transmission.

21. The method of claim 19, further comprising issuing an acknowledgement of slave device via last bit of address bits carried by the SDA.

22. The method of claim 19, further comprising issuing an acknowledgement of data receipt via last bit of data bits carried by the SDA.

23. A method for providing configuration data to a programmable logic device ("PLD") via a selectable multi-mode channel, the method comprising:
coupling the PLD to an external storage via a bus containing a serial data line ("SDA") and a serial clock line ("SCL");
detecting Inter-Integrated Circuit ("I2C") mode by a multi-mode controller ("MMC") of the PLD in accordance with least significant three (3) bits of address bits on the SDA;
configuring the MMC to the I2C mode for processing data from the SDA in accordance with I2C clock cycles carried over the SCL; and
transmitting configuration data from the external storage to a configuration storage in the PLD via the SDA in response to the I2C clock cycles operated by the PLD.

* * * * *